(12) United States Patent
Norair (10) Patent No.: US 8,774,096 B2
(45) Date of Patent: Jul. 8, 2014

(54) METHOD AND APPARATUS FOR RAPID GROUP SYNCHRONIZATION

(75) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 182 days.

(21) Appl. No.: 13/408,457

(22) Filed: Feb. 29, 2012

(65) Prior Publication Data

US 2012/0224530 A1   Sep. 6, 2012

Related U.S. Application Data

(60) Provisional application No. 61/464,376, filed on Mar. 2, 2011.

(51) Int. Cl.
*H04W 4/00* (2009.01)

(52) U.S. Cl.
USPC ........... 370/328; 370/329; 370/235; 370/392; 726/22; 726/24

(58) Field of Classification Search
USPC ................. 370/254, 329, 345, 468, 229–230, 370/235–236, 324, 310–312, 338, 370/390–392; 709/242, 244, 224; 726/22–24
See application file for complete search history.

(56) References Cited

U.S. PATENT DOCUMENTS

| 5,338,625 A | 8/1994 | Bates |
| 5,615,366 A | 3/1997 | Hansen |
| 5,729,557 A | 3/1998 | Gardner et al. |
| 5,959,281 A | 9/1999 | Domiteaux |
| 6,115,379 A | 9/2000 | Flanders et al. |

(Continued)

FOREIGN PATENT DOCUMENTS

| EP | 1321009 B1 | 1/2007 |
| WO | 2006001556 A1 | 1/2006 |
| WO | 2009023592 A2 | 2/2009 |

OTHER PUBLICATIONS

PCT Int'l Searching Authority, Notification Concerning Transmittal of the Int'l Search Report and The Written Opinion of the Int'l Searching authority or the Declaration in Int'l application No. PCT/US2012/027386 dated Oct. 16, 2012.

(Continued)

*Primary Examiner* — Charles C Jiang
*Assistant Examiner* — Mohamed Kamara
(74) *Attorney, Agent, or Firm* — McAndrews, Held & Malloy, Ltd.

(57) ABSTRACT

A first device of a network may decide to transmit a flood of packets that is longer in duration than the maximum amount of time that the first device can continuously transmit. The first device may coordinate with one or more second devices of the network such that each of the one or more second devices transmits a respective second portion of the flood of packets following transmission of a first portion of the flood of packets by the first network device. The packets may advertise a pending network event that is to occur at a time indicated by the contents of the packets. The first device may select the one or more second devices from a plurality of devices based on a location of the one or more second devices and/or how many third devices are in the network.

20 Claims, 5 Drawing Sheets

(56) References Cited

U.S. PATENT DOCUMENTS

| | | |
|---|---|---|
| 6,307,846 B1 | 10/2001 | Willey |
| 6,330,700 B1 | 12/2001 | Morris |
| 6,381,243 B1 | 4/2002 | Ekstedt |
| 6,388,997 B1 | 5/2002 | Scott |
| 6,424,301 B1 | 7/2002 | Johnson |
| 6,452,569 B1 | 9/2002 | Park |
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,009,941 B1 | 3/2006 | Uchino |
| 7,233,603 B2 | 6/2007 | Lee |
| 7,280,555 B2 | 10/2007 | Stanforth |
| 7,305,237 B2 | 12/2007 | Stephens |
| 7,308,103 B2 | 12/2007 | Corcoran et al. |
| 7,315,248 B2 | 1/2008 | Egbert |
| 7,330,446 B2 | 2/2008 | Lee |
| 7,369,512 B1 * | 5/2008 | Shurbanov et al. ........... 370/254 |
| 7,554,981 B2 | 6/2009 | Kecskemeti |
| 7,580,397 B2 | 8/2009 | Arai et al. |
| 7,606,256 B2 | 10/2009 | Vitebsky |
| 7,643,509 B2 | 1/2010 | Han et al. |
| 7,672,284 B2 | 3/2010 | Sugar et al. |
| 7,689,195 B2 | 3/2010 | Wu |
| 7,698,463 B2 * | 4/2010 | Ogier et al. .................. 709/242 |
| 7,735,116 B1 | 6/2010 | Gauvin |
| 7,760,689 B2 | 7/2010 | Shin |
| 7,805,129 B1 | 9/2010 | Issa |
| 7,814,107 B1 | 10/2010 | Thirumalai et al. |
| 7,890,839 B2 | 2/2011 | Iwami |
| 7,962,361 B2 | 6/2011 | Ramchandani |
| 8,035,488 B2 | 10/2011 | Shiotsu et al. |
| 8,036,715 B2 | 10/2011 | Buck |
| 8,325,665 B2 * | 12/2012 | Kim et al. .................... 370/329 |
| 8,351,409 B2 | 1/2013 | Albert |
| 8,554,271 B2 | 10/2013 | Wang et al. |
| 2002/0025823 A1 | 2/2002 | Hara |
| 2002/0078045 A1 | 6/2002 | Dutta |
| 2003/0115369 A1 | 6/2003 | Walter |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0139685 A1 | 6/2005 | Kozlay |
| 2005/0174953 A1 | 8/2005 | Ho |
| 2006/0002312 A1 | 1/2006 | Delattre et al. |
| 2006/0088021 A1 | 4/2006 | Nelson et al. |
| 2006/0091223 A1 | 5/2006 | Zellner |
| 2006/0175420 A1 | 8/2006 | Satou |
| 2006/0219776 A1 | 10/2006 | Finn |
| 2006/0220867 A1 | 10/2006 | Dixon |
| 2007/0000316 A1 | 1/2007 | Lauer |
| 2007/0010928 A1 | 1/2007 | Brusarosco |
| 2007/0058661 A1 | 3/2007 | Chow |
| 2007/0083924 A1 | 4/2007 | Lu |
| 2007/0099641 A1 | 5/2007 | Lastinger |
| 2007/0125836 A1 | 6/2007 | McAllister et al. |
| 2007/0136509 A1 | 6/2007 | Agami |
| 2007/0217449 A1 * | 9/2007 | Guzikevits ................... 370/468 |
| 2007/0232281 A1 | 10/2007 | Nakai |
| 2007/0295074 A1 | 12/2007 | Kobayakawa |
| 2008/0041936 A1 | 2/2008 | Vawter |
| 2008/0069097 A1 | 3/2008 | Motegi |
| 2008/0075123 A1 | 3/2008 | Fourcand |
| 2008/0107060 A1 | 5/2008 | Andou et al. |
| 2008/0112387 A1 * | 5/2008 | Gandham et al. ........... 370/345 |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Shoo et al. |
| 2008/0209322 A1 | 8/2008 | Kaufman |
| 2008/0228592 A1 | 9/2008 | Kotas |
| 2008/0238621 A1 | 10/2008 | Rofougaran |
| 2008/0256409 A1 | 10/2008 | Oran et al. |
| 2008/0302177 A1 | 12/2008 | Sinnett |
| 2008/0320139 A1 | 12/2008 | Fukuda |
| 2009/0003376 A1 | 1/2009 | Horvat |
| 2009/0006376 A1 | 1/2009 | Hendriks |
| 2009/0034491 A1 | 2/2009 | Adams |
| 2009/0055377 A1 | 2/2009 | Hedge |
| 2009/0069049 A1 | 3/2009 | Jain |
| 2009/0073070 A1 | 3/2009 | Rofougaran |
| 2009/0113267 A1 | 4/2009 | Harrison |
| 2009/0138948 A1 | 5/2009 | Calamera |
| 2009/0141531 A1 | 6/2009 | Abedin |
| 2009/0150646 A1 | 6/2009 | Allen |
| 2009/0171749 A1 | 7/2009 | Laruelle |
| 2009/0171947 A1 | 7/2009 | Karayel |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0003680 A1 | 1/2010 | Lewin et al. |
| 2010/0011156 A1 | 1/2010 | Yim |
| 2010/0026149 A1 | 2/2010 | Zhang et al. |
| 2010/0026589 A1 | 2/2010 | Dou |
| 2010/0027558 A1 | 2/2010 | Han |
| 2010/0052859 A1 | 3/2010 | Lossau |
| 2010/0078471 A1 | 4/2010 | Lin |
| 2010/0097946 A1 | 4/2010 | Celentano |
| 2010/0097956 A1 | 4/2010 | Tauil |
| 2010/0097957 A1 | 4/2010 | Pirzada et al. |
| 2010/0118737 A1 * | 5/2010 | Kim et al. ..................... 370/254 |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0232408 A1 | 9/2010 | Lim |
| 2010/0256976 A1 | 10/2010 | Atsmon |
| 2010/0280904 A1 | 11/2010 | Ahuja |
| 2010/0295681 A1 | 11/2010 | Burns et al. |
| 2010/0303051 A1 | 12/2010 | Umeuchi et al. |
| 2011/0003607 A1 | 1/2011 | Forenza et al. |
| 2011/0007733 A1 | 1/2011 | Kubler et al. |
| 2011/0064013 A1 | 3/2011 | Liu et al. |
| 2011/0074552 A1 | 3/2011 | Norair |
| 2011/0112892 A1 | 5/2011 | Tarantino |
| 2012/0001730 A1 | 1/2012 | Potyrailo |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0093151 A1 | 4/2012 | McFarland et al. |
| 2012/0116694 A1 | 5/2012 | Norair |
| 2012/0116887 A1 | 5/2012 | Norair |
| 2012/0118952 A1 | 5/2012 | Norair |
| 2012/0191848 A1 | 7/2012 | Norair |
| 2012/0191901 A1 | 7/2012 | Norair |
| 2012/0207141 A1 | 8/2012 | Norair |
| 2012/0209716 A1 | 8/2012 | Burns |
| 2012/0224491 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2013/0017788 A1 | 1/2013 | Norair |
| 2013/0210461 A1 | 8/2013 | Moldavsky et al. |

OTHER PUBLICATIONS

PCT International Searching Authority, Notification Concerning Transmittal of the International Search Report and The Written Opinion of the International Searching Authority, or the Declaration, in (56) References Cited

OTHER PUBLICATIONS

International application No. PCT/US2011/55118, dated Feb. 28, 2012. (25 pages).
PCT International Searching Authority, Notification Concerning Transmittal of the International Search Report and The Written Opinion of the International Searching Authority, or the Declaration, in International application No. PCT/US11/55082, dated Mar. 1, 2012 (13 pages).
PCT International Searching Authority, Notification Concerning Transmittal of the International Search Report and The Written Opinion of the International Searching Authority, or the Declaration, in International application No. PCT/US11/55934, dated Mar. 6, 2012 (11 pages).
PCT International Searching Authority, Notification Concerning Transmittal of the International Search Report and The Written Opinion of the International Searching Authority, or the Declaration, in International application No. PCT/US2011/055929, dated Jan. 30, 2012. (15 pages).
PCT International Searching Authority, Notification Concerning Transmittal of the International Search Report and The Written Opinion of the International Searching Authority, or the Declaration, in International application No. PCT/US2011/059292, dated Feb. 2, 2012. (12 pages).
PCT International Searching Authority, Notification Concerning Transmittal of the International Search Report and The Written Opinion of the International Searching Authority, or the Declaration, in International application No. PCT/US11/059304, dated Mar. 9, 2012 (11 pages).
PCT International Searching Authority, Notification Concerning Transmittal of the International Search Report and The Written Opinion of the International Searching Authority, or the Declaration, in International application No. PCT/US2011/060950, dated Mar. 16, 2012. (14 pages).
PCT International Searching Authority, Notification Concerning Transmittal of the International Search Report and The Written Opinion of the International Searching Authority, or the Declaration, in International application No. PCT/US12/22005, dated Mar. 29, 2012. (12 pages).
PCT International Searching Authority, Notification Concerning Transmittal of the International Search Report and The Written Opinion of the International Searching Authority, or the Declaration, in International application No. PCT/US12/22002, dated May 8, 2012. (13 pages).
PCT International Searching Authority, Notification Concerning Transmittal of the International Search Report and The Written Opinion of the International Searching Authority, or the Declaration, in International application No. PCT/US2012/025191 dated May 25, 2012 (8 pages).
PCT International Searching Authority, Notification Concerning Transmittal of the International Search Report and The Written Opinion of the International Searching Authority, or the Declaration, in International application No. PCT/US2012/025197 dated May 25, 2012 (7 pages).
PCT International Searching Authority, Notification Concerning Transmittal of the International Search Report and The Written Opinion of the International Searching Authority, or the Declaration, in International application No. PCT/US2012/027382 dated May 31, 2012 (10 pages).
PCT International Searching Authority, Notification Concerning Transmittal of the International Search Report and The Written Opinion of the International Searching Authority, or the Declaration, in International application No. PCT/US2012/027381 dated May 31, 2012 (13 pages).
PCT International Searching Authority, Notification Concerning Transmittal of the International Search Report and The Written Opinion of the International Searching Authority, or the Declaration, in International application No. PCT/US2012/027387 dated Jun. 6, 2012 (14 pages).
PCT International Searching Authority, Notification Concerning Transmittal of the International Search Report and The Written Opinion of the International Searching Authority, or the Declaration, in International application No. PCT/US2012/27378 dated Jun. 13, 2012 (14 pages).
PCT International Searching Authority, Notification Concerning Transmittal of the International Search Report and The Written Opinion of the International Searching Authority, or the Declaration, in International application No. PCT/US2012/027379 dated Jun. 20, 2012 (16 pages).
PCT International Searching Authority, Notification Concerning Transmittal of the International Search Report and The Written Opinion of the International Searching Authority, or the Declaration, in International application No. PCT/US2012/027384 dated Jun. 20, 2012 (10 pages).
Norair JP (2009). Introduction to DASH7 Technologies 1 st Edition. Whitepaper. Mar. 16, 2009. 1-22.
Richard MacManus. DASH7: Bringing Sensor Networking to Smartphones. readwrite.com. Apr. 11, 2010. pp. 1-5.

\* cited by examiner

FIG. 5

METHOD AND APPARATUS FOR RAPID GROUP SYNCHRONIZATION

CLAIM OF PRIORITY

This patent application makes reference to, claims priority to and claims benefit from U.S. Provisional Patent Application Ser. No. 61/464,376 entitled "Advanced Communication System for Wide-area Low Power Wireless Applications and Active RFID" and filed on Mar. 2, 2011.

The above-referenced application is hereby incorporated herein by reference in its entirety.

INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. Provisional Patent Application Ser. No. 61/572,390 titled "System for Adding Dash7-Based Applications Capability to a Smartphone" and filed on Jul. 15, 2011;
U.S. patent application Ser. No. 13/267,640 titled "Method and Apparatus for Adaptive Searching of Distributed Datasets" and filed on Oct. 6, 2011 (now published as 2012/0087267);
U.S. patent application Ser. No. 13/267,621 titled "Method and Apparatus for Low-Power, Long-Range Networking" and filed on Oct. 6, 2011 (now published as 2012/0087350);
U.S. patent application Ser. No. 13/270,802 titled "Method and Apparatus for a Multi-band, Multi-mode Smartcard" and filed on Oct. 11, 2011 (now published as 2012/0088449);
U.S. patent application Ser. No. 13/270,959 titled "Method and Apparatus for an Integrated Antenna" and filed on Oct. 11, 2011 (now published as 2012/0086615);
U.S. patent application Ser. No. 13/289,054 titled "Method and Apparatus for Electronic Payment" and filed on Nov. 4, 2011 (now published as 2012/0116887);
U.S. patent application Ser. No. 13/289,050 filed on Nov. 4, 2011 (now published as 2012/0116694);
U.S. patent application Ser. No. 13/297,348 titled "Method and Apparatus for Interfacing with a Smartcard" and filed on Nov. 16, 2011 (now U.S. Pat. No. 8,622,312);
U.S. patent application Ser. No. 13/354,513 titled "Method and Apparatus for Memory Management" and filed on Jan. 20, 2012 (now published as 2012/0191901);
U.S. patent application Ser. No. 13/354,615 titled "Method and Apparatus for Discovering, People, Products, and/or Services via a Localized Wireless Network" and filed on Jan. 20, 2012 (now published as 2012/01918481);
U.S. patent application Ser. No. 13/396,708 titled "Method and apparatus for Plug and Play, Networkable ISO 18000-7 Connectivity" and filed on Feb. 15, 2012 (now published as 2012/0207141);
U.S. patent application Ser. No. 13/396,739 titled "Method and Apparatus for Serving Advertisements in a Low-Power Wireless Network" and filed on Feb. 15, 2012 (now published as 2012/0209716);
U.S. patent application Ser. No. 13/289,050 titled "Method and Apparatus for Forward Error Correction (FEC) in a Resource-Constrained Network" and filed on Feb. 29, 2012 (now published as 2012/0116694);
U.S. patent application Ser. No. 13/408,447 titled "Method and Apparatus for Adaptive Traffic Management in a Resource-Constrained Network" and filed on Feb. 29, 2012 (now published as 2012/0224491);
U.S. patent application Ser. No. 13/408,453 titled "Method and Apparatus for Dynamic Media Access Control in a Multiple Access System" and filed on Feb. 29, 2012 (now published as 2012/0224590);
U.S. patent application Ser. No. 13/408,461 titled "Method and Apparatus for Addressing in a Resource-Constrained Network" and filed on Feb. 29, 2012 (now published as 2012/0226822);
U.S. patent application Ser. No. 13/408,464 titled "Method and Apparatus for Query-Based Congestion Control" and filed on Feb. 29, 2012 (now published as 2012/0224543); and
U.S. patent application Ser. No. 13/408,466 titled "Method and Apparatus for Power Autoscaling in a Resource-Constrained Network" and filed on Feb. 29, 2012 (now published as 2012/0225687).

Each of the above-referenced applications is hereby incorporated herein by reference in its entirety.

FIELD OF THE INVENTION

Certain embodiments of the invention relate to networking. More specifically, certain embodiments of the invention relate to a method and apparatus for rapid group synchronization.

BACKGROUND OF THE INVENTION

Existing methods and systems for synchronizing wireless devices are time and power intensive. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for rapid group synchronization, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g.," and "for example" introduce a list of one or more non-limiting examples, instances, or illustrations.

Figure 1:
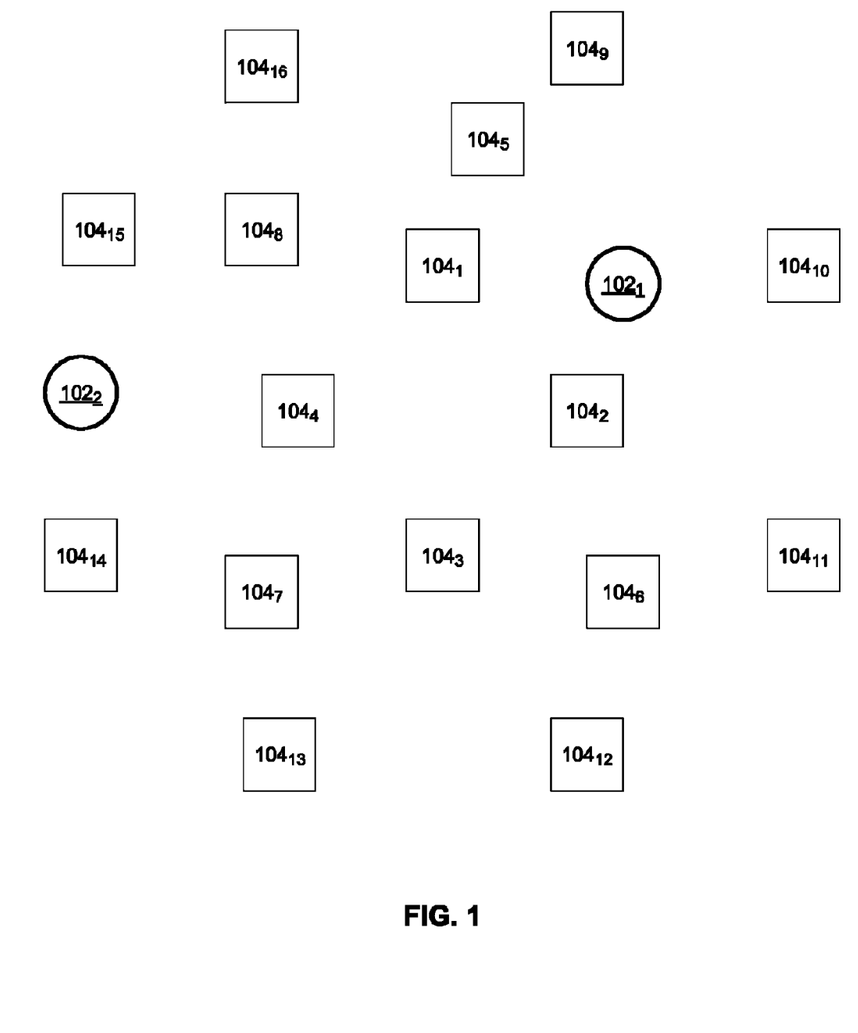
FIG. 1 depicts an exemplary wireless communication network in which network communications may be scheduled as needed and/or on-demand.

FIG. 1 depicts an exemplary wireless communication network in which network communications may be scheduled as needed and/or on-demand. Referring to FIG. 1, the network comprises base stations / sub-controllers $102_1$ and $102_2$, and endpoints $104_1$-$104_{16}$.

Each of the devices $102_1$ and $102_2$ may be, for example, a base station or a network sub-controller and may comprise circuitry for communicating wirelessly, and managing overall synchronization and access to the wireless network within the cell 108. The devices $102_1$ and $102_2$ may transmit and receive wireless signals in accordance with any one or more protocols. Such protocols may include, for example, protocols defined in the ISO 18000-7 standard, and/or protocols described in the above-incorporated U.S. Provisional Patent Application No. 61/464,376 filed on Mar. 2, 2011. An exemplary device 102 is described below with respect to FIG. 2.

Each of the endpoints $104_1$-$104_{15}$ may comprise circuitry for communicating wirelessly. Each of the devices $102_1$ and $102_2$ may communicate with in-range endpoints in accordance with any one or more protocols. Such protocols may include, for example, protocols defined in the ISO 18000-7 standard, and/or protocols described in the above-incorporated U.S. Provisional Patent Application No. 61/464,376 filed on Mar. 2, 2011. An exemplary endpoint 104 is described below with respect to FIG. 2.

In operation, the devices $102_1$ and $102_2$ may send two types of protocol data units (PDUs) to the devices $104_1$-$104_{15}$. A first type of PDU (referred to herein as a "background frame") may be utilized for scheduling the occurrence of events in the network, (e.g., with reference to the common network time and/or common time base), and/or for other network communications. A second type of PDU (referred to herein as a "foreground frame") may be utilized for data exchanges and/or other network communications.

The devices $102_1$ and $102_2$ may comprise clocks which may be utilized for scheduling communications and/or other events in the network. Generally speaking, transmissions in the network may be coordinated utilizing collision detection and/or collision avoidance, rather than a "fully-managed" or "time-slotted" scheme. As a result, at any given time, one or more of the devices $104_1$-$104_{15}$ may be transmitting on the medium, one or more of the devices $104_1$-$104_{15}$ may be listening on the medium, and one or more of the devices $104_1$-$104_{15}$ may be in a low-power or powered-down state. Consequently, reliably synchronizing all of the devices $104_1$-$104_{15}$ may require the transmission of multiple background frames in succession. That is, the more background frames that are consecutively sent, the more likely it may be that any or all devices $104_1$-$104_{15}$ have successfully received one of the background frames.

Each of the devices $102_1$ and $102_2$ may, however, be limited in how many consecutive background frames it can send. Accordingly, aspects of the invention may enable the devices $102_1$-$102_2$ to coordinate a flood of background frames where a transmission of one or more background packets on a particular channel by device $102_1$ is followed immediately (or as nearly immediately as may be possible or permitted) by a transmission of one or more background packets on the same channel by device $102_2$. In this manner, a flood of background packets twice as long as may be sent by device $102_1$ or $102_2$ alone may be achieved. For even longer floods, the devices $102_1$ and $102_2$ may coordinate with additional devices 102 (not shown) and/or the devices $102_1$ and $102_2$ may continue to alternate transmissions back-to-back for as long as may be desired.

Figure 2:
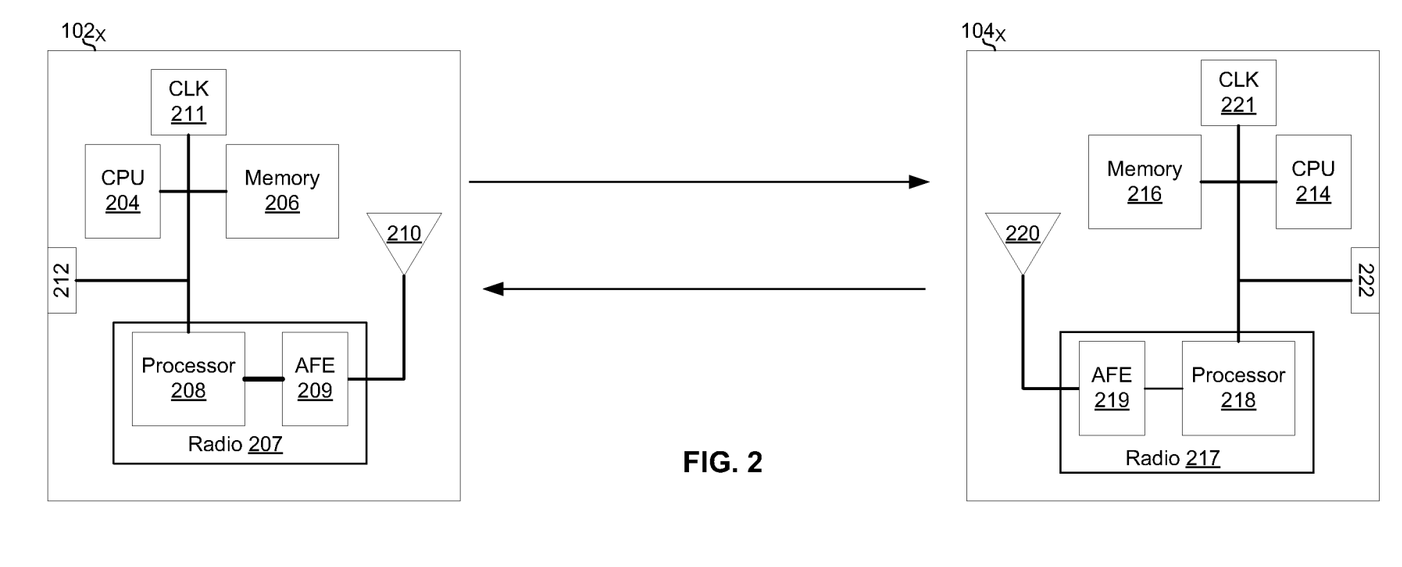
FIG. 2 depicts exemplary communication devices which may support rapid group synchronization.

FIG. 2 depicts exemplary communication devices which may support rapid group synchronization. Shown in FIG. 2 are details of an exemplary first device $102_X$ (which may generically represent each of the devices $102_1$ and $102_2$), and details of an exemplary second device $104_X$ (which generically represents each of the devices $104_1$-$104_{15}$).

The CPU 204 may comprise circuitry operable to control operation of the first device 102. The CPU 204 may, for example, execute an operating system and/or other programs such (e.g., programs that enable a user interface of the device 102). The CPU 204 may generate one or more control signals for controlling the operation of the device 102. The CPU 204 may, for example, control a mode of operation of the device 102.

The CPU 214 may comprise circuitry operable to control operation of the second device 104. In some instances, the CPU 214 may be substantially similar to the CPU 204. In instances that the device 102 is less resource-constrained device, such as a base station or network controller, and the device 104 is more resource-constrained device, such as a battery-powered tag or a smartcard as described in above-incorporated U.S. patent application Ser. No. 13/270,802, the CPU 204 may be less-complex (e.g., comprise fewer gates, utilize less power, utilize less memory, etc.) than the CPU 214. In one embodiment, for example, the CPU 204 may comprise a RISC or ARM processor, and the CPU 214 may comprise a state-machine having a relatively small number of states (e.g., four states).

The radio 207 may comprise a processor 208 and an analog front-end (AFE) 209. The processor 208 may comprise circuitry operable to interface with the AFE 209 to receive and transmit data, and to process received and to-be-transmitted data. For transmission, the processor 208 may be operable to receive data from the CPU 204 and/or memory 206, encode, packetize, and/or otherwise process the data to prepare it for transmission in accordance with one or more wireless protocols, and output the data to the AFE 209 for transmission. For reception, the processor 208 may be operable to receive data via the AFE 209, process the received data and output received data to the memory 206 and/or the CPU 204. Exemplary protocols which may be supported by the second device 104 include the ISO 18000-7 standard, and protocols described in the above-incorporated U.S. Provisional Patent Application having Ser. No. 61/464,376 filed on Mar. 2, 2011.

The radio 217 may comprise a processor 218 and an analog front-end (AFE) 219. The baseband processor 218 may comprise circuitry operable to interface with the AFE 219 to receive and transmit data, and to process received and to-be-transmitted data. In some instances, the baseband processor 218 may be substantially similar to the baseband processor 208. In instances that the device 102 is less-resource-constrained device, such as a base station or network controller, and the device 104 is a more-resource-constrained device, such as a battery-powered tag, the baseband processor 218 may be less-complex (e.g., comprise fewer gates, utilize less power, utilize less memory, etc.) than the baseband processor 208. In one embodiment, for example, the baseband processor 208 may be operable to implement more complex signal processing algorithms (e.g., FEC decoding) than the baseband processor 218.

The analog front-end (AFE) 209 may comprise circuitry suitable for processing received and/or to-be-transmitted data in the analog domain. For transmission, the AFE 209 may receive digital data from the baseband processor 208, process the data to generate corresponding RF signals, and output the RF signals to the antenna 210. For reception, the AFE 209 may receive RF signals from the antenna 210, process the RF signals to generate corresponding digital data, and output the digital data to the baseband processor 209. In some instances, the AFE 219 may be substantially similar to the AFE 209. In instances that the device 102 is less-resource-constrained device, such as a base station or network controller, and the device 104 is a more-resource-constrained device, such as a battery-powered tag, the AFE 219 may be less-complex (e.g., comprise fewer gates, utilize less power, utilize less memory, etc.) than the AFE 209. In one embodiment, for example, the AFE 209 may comprise a more-sensitive receiver, a more powerful transmitter than the AFE 219.

Circuitry of the memory 206 may comprise one or more memory cells and may be operable to store data to the memory cell(s) and read data from the memory cell(s). The one or more memory cell may comprise one or more volatile memory cells and/or one or more non-volatile memory cells. The memory 206 may store data arranged, for example, as an indexed short file block (ISFB) and/or indexed short file series block (ISFSB) as described in the above-incorporated U.S. Provisional Patent Application having Ser. No. 61/464,376.

Circuitry of the memory 216 may comprise one or more memory cells and may be operable to read data from the memory cell(s) and/or store data to the memory cell(s). The memory 216 may store data arranged, for example, as an indexed short file block (ISFB) and/or indexed short file series block (ISFSB) as described in the above-incorporated U.S. Provisional Patent Application having Ser. No. 61/464,376. In some instances, the memory 216 may be substantially similar to the memory 206. In instances that the device 104 is resource-constrained, the memory 216 may be less-complex (e.g., comprise fewer gates, utilize less power, etc.) than the memory 206.

Each of the clocks 211 and 221 may be operable to generate one or more oscillating signals which may be utilized to control synchronous circuitry of the device 100. Each of the clocks 211 and 221 may comprise, for example, one or more crystal oscillators, phase-locked loops, and/or direct digital synthesizers. Each of the clocks 211 and 221 may also comprise a "date/time" or "real-time" clock operable to keep track of time of day, day of week, day of month, month, and/or year.

The interfaces 212 and 222 may enable configuring and/or programming the devices 102 and 104, respectively. In an exemplary embodiment, one or more values of one or more timing parameters may be programmed via the programming interfaces 212 and/or 222.

Each of the antennas 210 and 220 may be operable to transmit and receive electromagnetic signals in one or more frequency bands. In an embodiment of the invention, the antennas 210 and 220 may be operable to transmit and receive signals in the ISM frequency band centered at 433.92 MHz.

In operation, the device $102_X$ may decide to (or be instructed to) schedule a network communication (e.g., schedule a search of the devices $104_1$-$104_{15}$) to occur at time T, where T may be referenced to a common time base (e.g., ticks of a fixed-frequency oscillator) and/or to a real-time clock. For example, the device $102_X$ may generate a background frame that instructs destination devices (i.e. devices for which the frame is destined) receiving the background frame to be prepared (e.g., have their receivers on and listening to a particular channel) to receive a search request at time T. From time T−2Δ until time T+Δ, where Δ is some positive value, the device $102_X$ may transmit the generated background frame one or more times in succession. The amount of time between transmissions of the background frame may be as short as is permissible and/or allowed. If, during the time period from time T−2Δ to time T+Δ, the device $104_X$ was listening to the channel(s) on which the background frame was transmitted, then the device may have received the background frame, and scheduled itself to turn on the receive portion of its radio 217 at time T−α (where α is the amount of time that it takes the receiver to power-up and stabilize).

If, on the other hand, the device $104_X$ was not receiving during the period from time T−2Δ to time T+Δ, (e.g., because its receiver was off and/or it was busy transmitting), then the clock 221 may have failed to schedule the reception of the request at time T−α. Consequently, the device $104_X$ may miss the search request and the results of search may be sub-optimal.

Figure 3A:
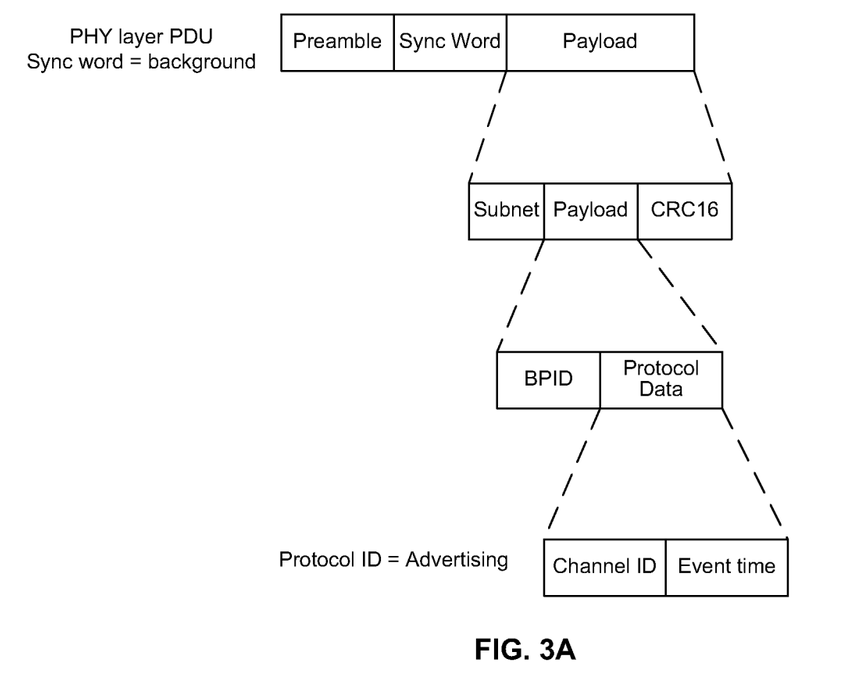
FIG. 3A illustrates an exemplary physical layer PDU utilized for synchronizing network devices and scheduling network events.

FIG. 3A illustrates an exemplary physical layer PDU utilized for synchronizing network devices and scheduling network events. The physical layer frame comprises a preamble, a sync word, and a payload. The preamble may be utilized for phase and/or frequency locking the receive circuitry of the device receiving the PDU. The sync word may identify whether the PDU contains a background frame or a foreground frame. In the case of FIG. 3A, the sync word may indicate that the PDU contains a background frame.

The payload comprises a data link layer (OSI layer 2) PDU; in this case, a background frame. The background frame comprises a subnet field, a background protocol ID (BPID) field, and a CRC field. The subnet field may be a value utilized for packet filtering. Specifically, devices which have a device subnet specifier that does not match the value in the subnet field of the frame may ignore/discard the frame. The CRC field may be utilized for performing error detection and/or correction on the received PDU.

The payload comprises a background protocol ID (BPID) field and protocol data. The BPID may indicate which background frame protocol(s) is to be utilized for parsing and/or processing the received frame. In the case of FIG. 3A, the background protocol is an advertising protocol, and the protocol data comprises a channel ID field and an event time field. For each devices $104_X$ that received the frame and determined that it was a valid destination of the frame, the event time field may indicate a time at which the device should prepare to receive a transmission and the channel ID field may indicate a channel on which the device $104_X$ should prepare to receive the transmission. The event time field may be formatted as amount of time until the event and/or real-time at which the event will occur.

Figure 3B:
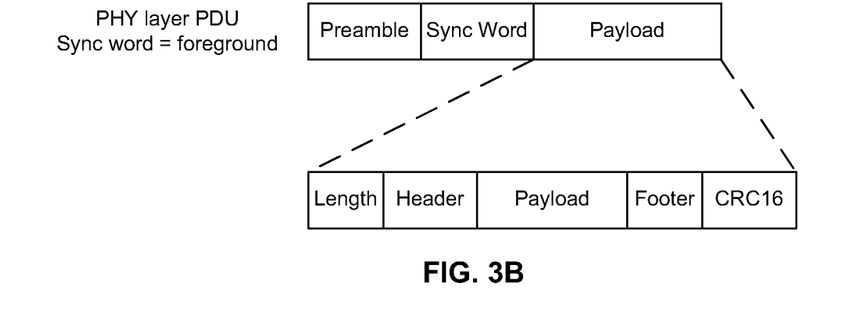
FIG. 3B illustrates an exemplary physical layer PDU utilized for data communication.

FIG. 3B illustrates an exemplary physical layer PDU utilized for data communication. The physical layer frame comprises a preamble, a sync word, and a payload. The payload comprises a data link layer (OSI layer 2) PDU, in this case, a foreground frame. The foreground frame comprises a length field, a header field, a payload, a footer, and a cyclic redundancy check field. The payload may comprise, for example, a network layer (OSI layer 3) PDU. The headers field may comprise, for example, T×EIRP field, a subnet field, a frame control field, a data link layer security (DLLS) code, DLLS initialization data, a dialog identifier, a flags field, a source ID, and a target ID. The frame control field comprises a listen flag, a DLLS flag, an enable addressing flag, a frame continuity flag, a CRC32 flag, a not mode 2 flag, and a mode 2 frame type flag. The flags field comprises an addressing option flag, a virtual ID flag, a network layer security flag, and application flags.

Figure 4A:
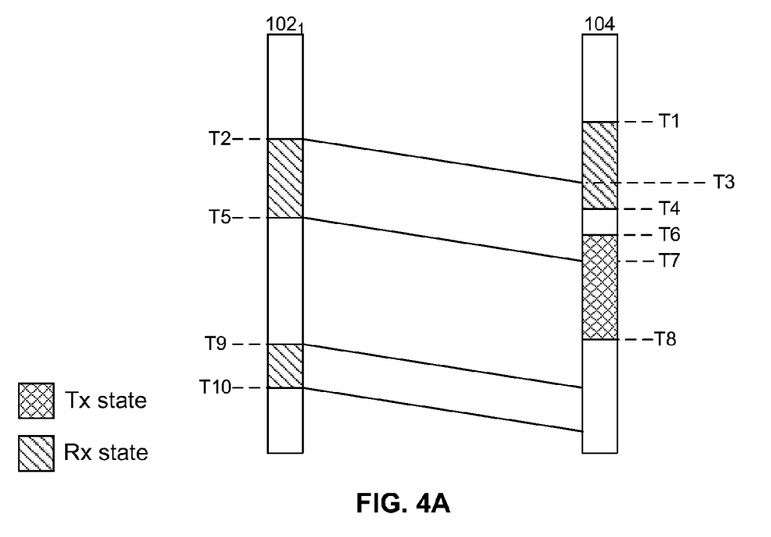
FIG. 4A is a diagram illustrating scheduling of a network communication via communications from a single requesting device.

FIG. 4A is a diagram illustrating scheduling of a network communication via communications from a single requesting device. From time instant T2 to time instant T5, the device 102 may begin transmitting background frames to schedule a search at time instant T9. The background frames may arrive at the device 104 from time instant T3 until time instant T7. The device 104, however, may be transmitting from time instant T1 to time instant T4 and may not begin receiving until T6. As a result, the device 104 may not successfully receive one of the background packets transmitted by the device $102_1$ from time instant T2 to T5. Consequently, the device 104 may not schedule reception of the search request at time instant T9, and may not participate in the search. Had the device 1021 transmitted background packets (e.g., until time instant T8) perhaps the device 104 would have successfully received the background frame, but the device 1021 may be prevented from transmitting longer than the duration of T5–T2.

Figure 4B:
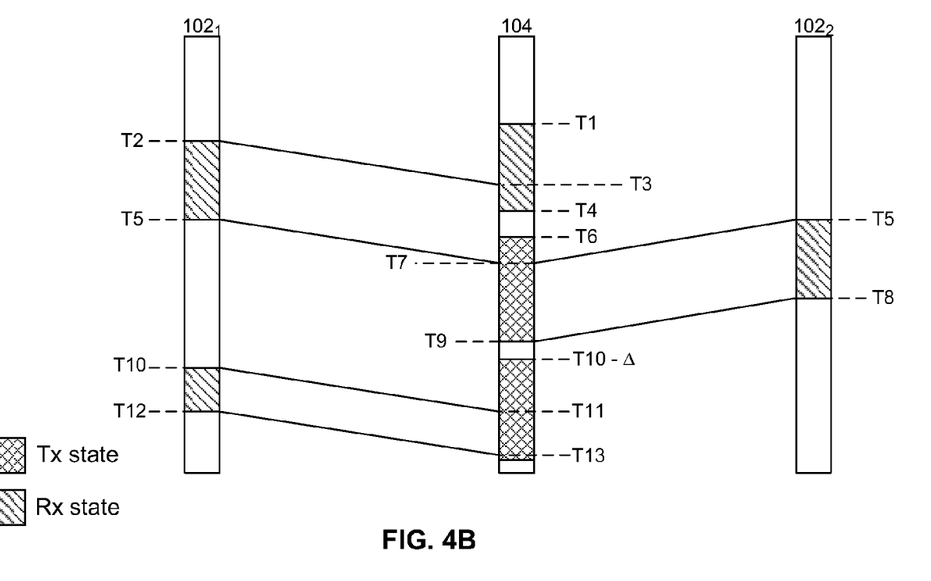
FIG. 4B is a diagram illustrating scheduling of a network communication via communications from a single requesting device.

FIG. 4B is a diagram illustrating scheduling of a network communication via communications from a single requesting device. From time instant T2 to time instant T5, the device 102 may begin transmitting background frames to schedule a search at time instant T10. The background frames may arrive at the device 104 from time instant T3 until time instant T7. The device 104, however, may be transmitting from time instant T1 to time instant T4 and may not begin receiving until T6. As a result, the device 104 may not successfully receive one of the background packets transmitted by the device $102_1$ from time instant T2 to T5. In contrast to FIG. 4A, however, at time instant T5 the device $102_2$ may begin transmitting the background frame, and the transmissions may arrive at device 104 between time instants T7 and T9. The device 104 may successfully receive one of the background frames transmitted between time instants T5 and T8 and may, consequently, schedule reception of the search to be transmitted at time instant T10. Accordingly, at time instant T10–Δ, the device 104 may power-up its receiver, and may receive the search request from time instant T11 to T13.

Figure 5:
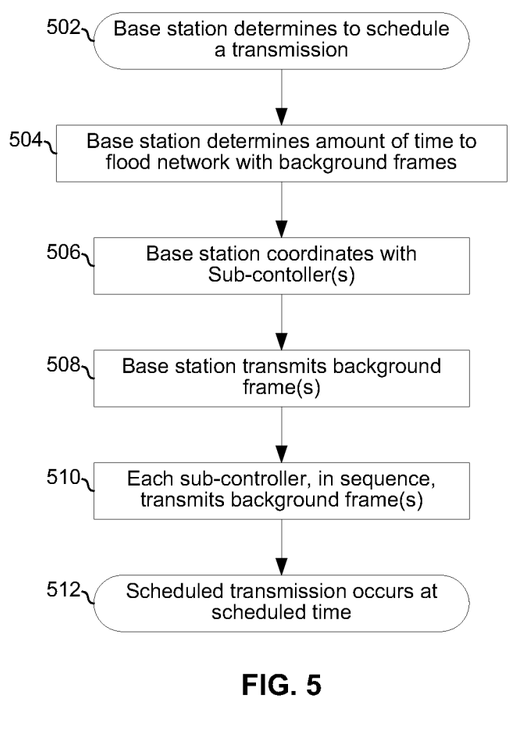
FIG. 5 is a flowchart illustrating exemplary steps for event scheduling in a network comprising a plurality of resource-constrained devices.

FIG. 5 is a flowchart illustrating exemplary steps for event scheduling in a network comprising a plurality of resource-constrained devices. The exemplary steps begin with step 502 in which a base station (e.g., device $102_1$) determines to schedule a network transmission. The network transmission may be, for example, a search request.

In step 504, the base station may determine an amount of time for which to transmit background frames advertising the scheduled network transmission. The duration of the flood of background frames may be determined based on a variety of factors such as, for example: how many devices 104 are present in the network, a distance to one or more of the devices 104, how frequently the devices 104 typically transmit, how frequently the devices 104 typically perform a channel scan, power and/or sources available to the base station (e.g., if it is running on battery power it may want to reduce the length of the flood), and/or amount of time until the scheduled event.

In step 506, the base station may coordinate with sub-controllers (e.g., device $102_2$) in the network to transmit the flood of background frames. The sub-stations may enlist other devices to participate in the flood because, for example, the flood will be longer than the base station can transmit (e.g., because of technical and/or regulatory limitations). The sub-stations may enlist other devices to participate in the flood because, for example, the large number of devices 104 in the network makes it unlikely that greater than a threshold percentage (which may be configurable and/or vary with the circumstances of the scheduled transmission) of the devices 104 will receive the background frames if the duration of the flood is limited to the maximum duration of continuous transmission by the base station. The sub-stations may enlist other devices to participate in the flood because of the distance between the base station and one or more devices in the network. For example, based on past communications with the sub-controller and/or the devices 104, the base station may be aware that the sub-controller may be closer to one or more devices 104 and thus enable more reliably reaching those one or more devices. In an exemplary embodiment, the base station may coordinate with the sub-controller(s) via a different protocol (wired, wireless, or optical) than the protocol utilized for communicating with the devices 104. For example, the base station and sub-controller(s) may have wired connections to a LAN or the Internet.

In step 508, the base station may transmit its portion of the background frames. Devices which perform a channel scan during this time period may successfully receive one or more of the background frames and may schedule reception of the pending transmission being advertised in the background frames. Devices which do not perform a channel scan during this time period may not receive one or more of the background frames and, consequently, may not schedule reception of the pending transmission being advertised in the background frames.

In step 510, the sub-controllers with which the base station coordinated in step 506 may, sequentially in turn, transmit its share of the background frames. Devices which perform a channel scan during this time period (which may include devices which did not perform a channel scan during step 508) may successfully receive one or more of the background frames and may schedule reception of the pending transmission being advertised in the background frames.

In another embodiment of the invention, the coordinating of the sub-controllers may comprise controlling their transmit strength such that their transmissions are non-overlapping. In this manner, all of the sub-controllers could transmit the flood concurrently.

In step 512, the scheduled transmission (e.g., a search request as described in above-incorporated U.S. patent application Ser. No. 13/267,640) may take place at the scheduled time. In an exemplary embodiment, the scheduled transmission may be transmitted only by the base station. In another exemplary embodiment, the request may be transmitted concurrently by a plurality of sub-controllers each of which has had its transmit power and/or transmit channel configured to not overlap with other ones of the sub-controllers (i.e., so the packets from the various sub-controllers does not collide).

In an exemplary embodiment of the invention, a first device $102_1$ of a network may decide to transmit a flood of packets that is longer in duration than the maximum amount of time that the first device can continuously transmit. The first device $102_1$ may coordinate with one or more second devices $102_2$-

$102_N$ (where N is an integer greater than 1) of the network such that each of the one or more second devices 102 transmits a respective second portion of the flood of packets following transmission of a first portion of the flood of packets by the first network device $102_1$. The packets may advertise a pending network event that is to occur at a time indicated by the contents of the packets (e.g., by an event time field). The network event comprises the transmission of a search request. The packets may contain a channel identifier field that indicates a channel on which the search request will be transmitted. The device $102_1$ may select the one or more second devices $102_2$-$102_N$ from a plurality of devices based on a location of the one or more second devices $102_2$-$102_N$. The device $102_1$ may select the one or more second network devices from a plurality of devices based on how many third devices 104 are in the network. The plurality of second devices $102_2$-$102_N$ may concurrently transmit their respective portions of the flood. A transmit power utilized by each of the one or more second devices for transmitting its respective portion of the flood may be controlled to avoid collisions between packets of the flood. Each one of the plurality of second devices $102_2$-$102_N$ may transmit its respective portion of the flood on a channel that is different than a channel utilized by each other one of the plurality of second devices $102_2$-$102_N$ for transmitting their respective portions of the flood. The packets may be background frames comprising a subnet field, a background protocol identifier field, a channel identifier field, and an event time field.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for rapid group synchronization Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a first device of a network:
   determining a duration for which a flood of packets is to be transmitted, wherein said determining is based on a quantity of third devices to be synchronized in said network;
   determining whether said duration is greater than a maximum amount of time that said first device is permitted to continuously transmit;
   if said duration is less than said maximum amount of time, transmitting said flood of packets; and
   if said duration is greater than said maximum amount of time that said first device is permitted to continuously transmit:
   coordinating with one or more second devices of said network such that each of said one or more second devices is configured to transmit a respective second portion of said flood of packets following transmission of a first portion of said flood of packets by said first device of said network; and
   transmitting said first portion of said flood of packets.

2. The method of claim 1, wherein said packets advertise a pending network event that is to occur at a time indicated by the contents of said packets.

3. The method of claim 2, wherein said network event comprises transmission of a search request.

4. The method of claim 3, wherein said packets contain a channel identifier field that indicates a channel on which said search request will be transmitted.

5. The method of claim 1, comprising selecting said one or more second devices from a plurality of devices based on a location of said one or more second devices.

6. The method of claim 1, comprising selecting said one or more second devices from a plurality of devices based on said quantity of said third devices to be synchronized.

7. The method of claim 1, wherein:
   said one or more second devices is a plurality of second devices; and
   said plurality of second devices concurrently transmit their said respective portions of said flood of packets.

8. The method of claim 7, wherein a transmit power utilized by each of said one or more second devices for transmitting its said respective portion of said flood of packets is controlled to avoid collisions between packets of said flood of packets.

9. The method of claim 7, wherein each one of said plurality of second devices transmits its said respective portion of said flood of packets on a channel that is different than a channel utilized by each other one of said plurality of second devices for transmitting their said respective portions of said flood of packets.

10. The method of claim 1, wherein said packets are background frames comprising a subnet field, a background protocol identifier field, a channel identifier field, and an event time field.

11. A system comprising:
   a first device of a network, said first device being operable to:

decide to transmit, at a first time, a flood of packets having a duration that is longer than a maximum amount of time that said first device can continuously transmit;

determine a second device of said network to transmit a second portion of said flood of packets;

determine a second time at which said second device is to transmit said second portion of said flood of packets;

coordinate with said second device of said network such that said second device is configured to transmit said second portion of said flood of packets at said second time; and transmit a first portion of said flood of packets at said first time, wherein said second time is after said first time and is determined such that said flood of packets will jam, for at least said duration, a channel on which it is transmitted by said first device and said second device.

12. A system comprising:

a first device of a network, said first device being operable to:

decide to transmit a flood of packets that is longer in duration than the maximum amount of time that said first device can continuously transmit; and coordinate with one or more second devices of said network such that each of said one or more second devices transmits a respective second portion of said flood of packets following transmission of a first portion of said flood of packets by said first device of said network, wherein said packets advertise a pending network event that is to occur at a time indicated by the contents of said packets.

13. The system of claim 12, wherein said network event comprises the transmission of a search request.

14. The system of claim 13, wherein said packets contain a channel identifier field that indicates a channel on which said search request will be transmitted.

15. The system of claim 12, wherein said first device is operable to select said one or more second devices from a plurality of devices based on a location of said one or more second devices.

16. The system of claim 12, wherein said first device of said network is operable to select said one or more second devices from a plurality of devices based on how many third devices are in said network.

17. The system of claim 12, wherein:

said one or more second devices is a plurality of second devices; and said plurality of second devices concurrently transmit their said respective portions of said flood of packets.

18. The system of claim 17, wherein a transmit power utilized by each of said one or more second devices for transmitting its said respective portion of said flood of packets is controlled to avoid collisions between packets of said flood of packets.

19. The system of claim 17, wherein each one of said plurality of second devices transmits its said respective portion of said flood of packets on a channel that is different than a channel utilized by each other one of said plurality of second devices for transmitting their said respective portions of said flood of packets.

20. The system of claim 11, wherein said packets are background frames comprising a subnet field, a background protocol identifier field, a channel identifier field, and an event time field.

* * * * *